(12) United States Patent
Lajewardi et al.

(10) Patent No.: US 11,572,915 B2
(45) Date of Patent: Feb. 7, 2023

(54) SCREW-TYPE FASTENER FOR CEMENT BOARD

(71) Applicant: THE HILLMAN GROUP, INC., Cincinnati, OH (US)

(72) Inventors: Farhad Lajewardi, Toronto (CA); Shreenivas Iyer, Ontario (CA)

(73) Assignee: THE HILLMAN GROUP, INC., Cincinnati, OH (US)

( * ) Notice: Subject to any disclaimer, the term of this patent is extended or adjusted under 35 U.S.C. 154(b) by 403 days.

(21) Appl. No.: 16/784,411

(22) Filed: Feb. 7, 2020

(65) Prior Publication Data
US 2020/0173481 A1    Jun. 4, 2020

Related U.S. Application Data

(63) Continuation-in-part of application No. 16/426,580, filed on May 30, 2019, now abandoned.
(Continued)

(51) Int. Cl.
*F16B 25/00* (2006.01)

(52) U.S. Cl.
CPC ...... *F16B 25/0068* (2013.01); *F16B 25/0031* (2013.01); *F16B 25/0073* (2013.01);
(Continued)

(58) Field of Classification Search
CPC .. F16B 25/00; F16B 25/0026; F16B 25/0031; F16B 25/0047; F16B 25/0052;
(Continued)

(56) References Cited

U.S. PATENT DOCUMENTS

| 877,131 A | 1/1908 | Searelle |
|---|---|---|
| 3,124,031 A | 3/1964 | Knohl |

(Continued)

FOREIGN PATENT DOCUMENTS

| EP | 3002468 A1 | 4/2016 |
|---|---|---|
| GB | 2516628 A | 2/2015 |
| TW | 202006225 A | 2/2020 |

OTHER PUBLICATIONS

PCT, International Search Report and Written Opinion, International Application No. PCT/US2019/34780; dated Sep. 17, 2019, 13 pages.
(Continued)

*Primary Examiner* — Roberta S Delisle
(74) *Attorney, Agent, or Firm* — Thompson Hine LLP

(57) ABSTRACT

A cement board screw a high thread that begins on the tapered end, extends onto the shank and terminates at a second axial location along the shank. The high thread defines a high peripheral edge, where a leading flank and a trailing flank meet at the high peripheral edge and together define a high thread angle that is between about thirty degrees and about fifty-five degrees. A low thread begins on the tapered end, extends onto the shank and terminates substantially at a first axial location along the shank such that an axial length of the low thread is less than an axial length of the high thread. The low thread includes a leading flank and a trailing flank that meet at a low peripheral edge and together define a low thread angle that is between about fifty degrees and about seventy degrees.

23 Claims, 16 Drawing Sheets

Related U.S. Application Data

(60) Provisional application No. 62/689,363, filed on Jun. 25, 2018.

(52) U.S. Cl.
CPC .......... *F16B 25/0084* (2013.01); *F16B 25/00* (2013.01); *F16B 25/0047* (2013.01)

(58) Field of Classification Search
CPC .............. F16B 25/0057; F16B 25/0068; F16B 25/0073; F16B 25/0084; F16B 25/103; Y10S 411/919
USPC ................... 411/386, 387.5–387.8, 402–403, 411/411–412, 418, 420–421
See application file for complete search history.

(56) References Cited

U.S. PATENT DOCUMENTS

| | | | |
|---|---|---|---|
| 5,061,136 A * | 10/1991 | Dixon | ................ F16B 25/0068 411/386 |
| 5,516,248 A | 5/1996 | DeHaitre | |
| 5,518,352 A | 5/1996 | Lieggi | |
| 6,086,303 A | 7/2000 | Fluckiger | |
| 6,190,102 B1 | 2/2001 | Vignotto | |
| 6,223,634 B1 | 5/2001 | Hughes | |
| 6,558,097 B2 | 5/2003 | Mallet | |
| 6,601,482 B2 | 8/2003 | Hughes | |
| 6,616,391 B1 | 9/2003 | Druschel | |
| 6,666,638 B2 | 12/2003 | Craven | |
| 6,843,729 B2 | 1/2005 | Hughes | |
| 6,890,139 B2 | 5/2005 | Hughes | |
| 7,207,761 B2 | 4/2007 | Dill | |
| 7,293,947 B2 * | 11/2007 | Craven | ................ F16B 35/048 411/399 |
| 7,695,228 B2 | 4/2010 | Craven | |
| 8,104,248 B2 | 1/2012 | Gillis | |
| 8,202,032 B2 | 6/2012 | Gillis | |
| 8,647,038 B2 | 2/2014 | Gong | |
| 9,103,364 B2 | 8/2015 | Lin | |
| 9,234,539 B2 | 1/2016 | Gonciarz | |
| 9,581,183 B2 | 2/2017 | Lajewardi et al. | |
| 10,197,087 B2 | 2/2019 | Hargis | |
| 10,247,219 B2 | 4/2019 | Lajewardi et al. | |
| 10,436,238 B2 * | 10/2019 | Falkenstein | ......... F16B 25/0015 |
| 10,767,681 B2 | 9/2020 | Hargis | |
| 10,982,703 B2 | 4/2021 | Lajewardi et al. | |
| 11,105,361 B2 | 8/2021 | Lajewardi et al. | |
| 11,204,055 B2 | 12/2021 | Lajewardi et al. | |
| 2005/0226701 A1 | 10/2005 | Craven | |
| 2005/0265806 A1 * | 12/2005 | Craven | ................. F16B 5/0275 411/386 |
| 2007/0237606 A1 * | 10/2007 | Takasaki | ................. F16B 25/10 411/387.2 |
| 2007/0269287 A1 * | 11/2007 | Runge | ..................... F16B 33/02 411/378 |
| 2009/0097942 A1 | 4/2009 | Weiss | |
| 2011/0176888 A1 | 7/2011 | Gaudron | |
| 2012/0294693 A1 * | 11/2012 | Gonciarz | ............ F16B 25/0063 411/387.1 |
| 2013/0011214 A1 * | 1/2013 | Lin | ..................... F16B 25/0057 411/387.4 |
| 2015/0010374 A1 | 1/2015 | Park | |
| 2015/0184685 A1 * | 7/2015 | Su | ......................... F16B 25/103 411/387.2 |
| 2016/0061247 A1 * | 3/2016 | Gong | .................... F16B 25/103 411/387.2 |
| 2016/0186794 A1 * | 6/2016 | Belinda | ............... F16B 25/0015 411/387.1 |
| 2016/0238053 A1 | 8/2016 | Lajewardi et al. | |
| 2017/0016468 A1 * | 1/2017 | Lin | ..................... F16B 25/0063 |
| 2017/0122356 A1 | 5/2017 | Lajewardi et al. | |
| 2017/0284447 A1 * | 10/2017 | Falkenstein | .......... F16B 23/003 |
| 2018/0142723 A1 | 5/2018 | Craven | |
| 2019/0063480 A1 | 2/2019 | Lajewardi | |
| 2019/0136897 A1 | 5/2019 | Lajewardi | |
| 2019/0309784 A1 | 10/2019 | Lajewardi | |
| 2019/0390700 A1 | 12/2019 | Iyer | |

OTHER PUBLICATIONS

Taiwan Intellectual Property Office, English translation of Search Report, Taiwan Patent Application No. 110104141, 1 page, dated Apr. 1, 2022.

* cited by examiner

SCREW-TYPE FASTENER FOR CEMENT BOARD

TECHNICAL FIELD

This application relates generally to threaded fasteners for cement board applications, and more particularly, to a multi-thread cement board screw.

BACKGROUND

A typical screw configuration includes an elongated shank that extends between a driving head of the screw and a pointed end of the screw. At least part of the shank is helically threaded. Cement board screws with a variety of configurations are known. However, improvements are continuously sought.

It would be desirable to provide a cement board screw configuration that facilitates quick and effective installation with relatively low torque requirement and a resulting high resistance to pull-out after installation.

SUMMARY

In one aspect, a cement board screw includes advantageous performance features.

In another aspect, a cement board screw includes a head end, a shank and a tapered end, the head end including a tool engaging part, the head end located at one end of the shank and the tapered end located at an opposite end of the shank. A high thread is formed along the shank, wherein the high thread begins on the tapered end, extends onto the shank and terminates at a first axial location along the shank. The high thread defines a high peripheral edge, wherein the high thread includes a leading flank and a trailing flank that meet at the high peripheral edge and together define a high thread angle that is between about thirty degrees and about fifty-five degrees. A low thread formed along the shank, wherein the low thread begins on the tapered end, extends onto the shank and terminates substantially at the first axial location along the shank such that an axial length of the low thread is substantially the same as and contiguous with an axial length of the high thread. The low thread defines a low peripheral edge, wherein the low thread includes a leading flank and a trailing flank that meet at the low peripheral edge and together define a low thread angle that is between about fifty degrees and about seventy degrees.

In another aspect, a cement board screw includes a head end, a shank and a tapered end, the head end including a tool engaging part, the head end located at one end of the shank and the tapered end located at an opposite end of the shank. A high thread is formed along the shank, wherein the high thread begins on the tapered end, extends onto the shank and terminates at a first axial location along the shank. The high thread defines a high peripheral edge, wherein the high thread includes a leading flank and a trailing flank that meet at the high peripheral edge and together define a high thread angle. The first axial location is spaced from the head end. A low thread is formed along the shank, wherein the low thread begins on the tapered end, extends onto the shank and terminates substantially at the first axial location along the shank such that an axial length of the low thread is substantially the same as and contiguous with an axial length of the high thread. The low thread defines a low peripheral edge, wherein the low thread includes a leading flank and a trailing flank that meet at the low peripheral edge and together define a low thread angle. The low thread angle is larger than the high thread angle. A set of counter threads on the shank run from proximate the first axial location toward the head end, the counter threads having a helical direction that is opposite a helical direction of the high thread and the low thread.

In another aspect, a cement board screw includes a head end, a shank and a tapered end, the head end including a tool engaging part, the head end located at one end of the shank and the tapered end located at an opposite end of the shank. A high thread is formed along the shank, wherein the high thread begins on the tapered end, extends onto the shank and terminates at a second axial location along the shank. The high thread defines a high peripheral edge, wherein the high thread includes a leading flank and a trailing flank that meet at the high peripheral edge and together define a high thread angle that is between about thirty degrees and about fifty-five degrees. A low thread formed along the shank, wherein the low thread begins on the tapered end, extends onto the shank and terminates substantially at the first axial location along the shank such that an axial length of the low thread is less than an axial length of the high thread. The low thread defines a low peripheral edge, wherein the low thread includes a leading flank and a trailing flank that meet at the low peripheral edge and together define a low thread angle that is between about fifty degrees and about seventy degrees.

In another aspect, a cement board screw includes a head end, a shank and a tapered end, the head end including a tool engaging part, the head end located at one end of the shank and the tapered end located at an opposite end of the shank. A high thread is formed along the shank, wherein the high thread begins on the tapered end, extends onto the shank and terminates at a second axial location along the shank. The high thread defines a high peripheral edge, wherein the high thread includes a leading flank and a trailing flank that meet at the high peripheral edge and together define a high thread angle. The first axial location is spaced from the head end and the second axial location is proximal to the head end. A low thread is formed along the shank, wherein the low thread begins on the tapered end, extends onto the shank and terminates substantially at the first axial location along the shank such that an axial length of the low thread is less than an axial length of the high thread. The low thread defines a low peripheral edge, wherein the low thread includes a leading flank and a trailing flank that meet at the low peripheral edge and together define a low thread angle. The low thread angle is larger than the high thread angle. A set of counter threads on the shank run from proximate the first axial location to proximate the second axial location, the counter threads having a helical direction that is opposite a helical direction of the high thread and the low thread.

The details of one or more embodiments are set forth in the accompanying drawings and the description below. Other features, objects, and advantages will be apparent from the description and drawings, and from the claims.

DETAILED DESCRIPTION

Figure 1:
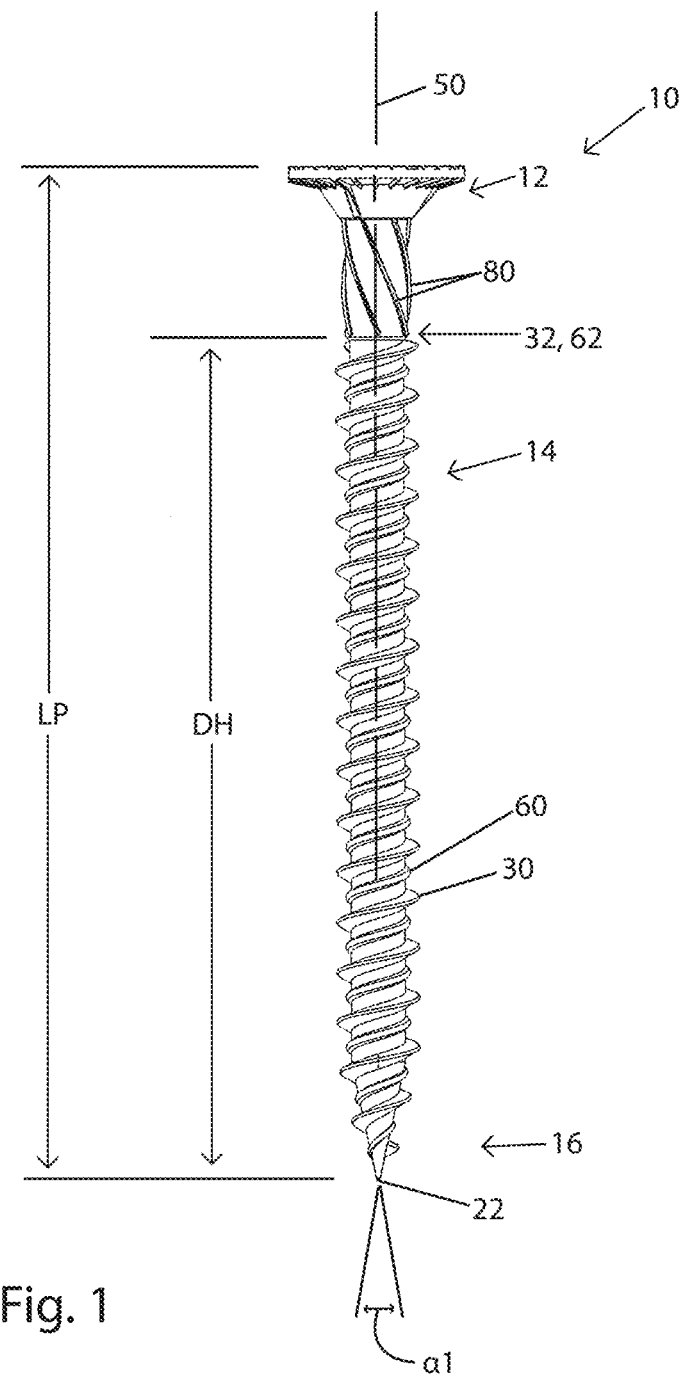
FIG. 1 shows a side elevation view of one embodiment of a cement board screw.
Figure 2:
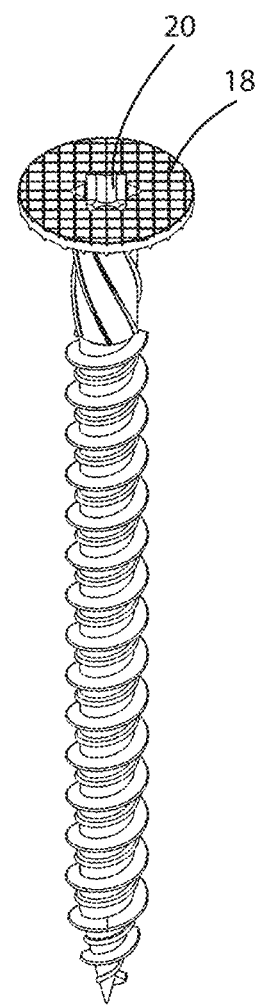
FIGS. 2 and 3 show perspective views of the screw.
Figure 3:
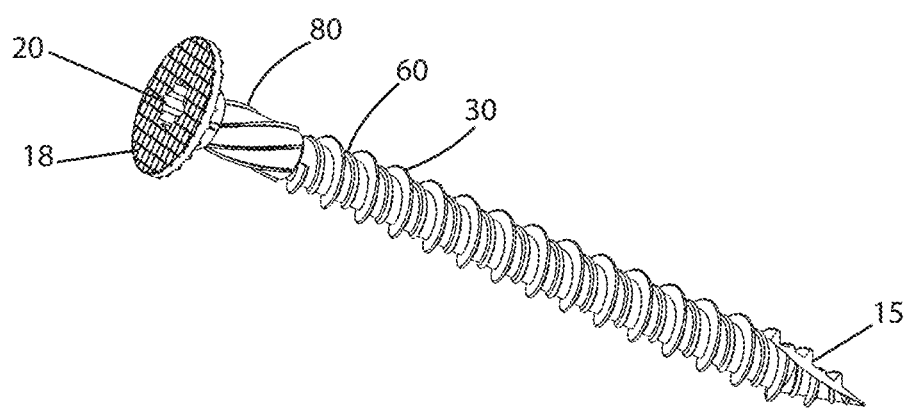
Figure 4:
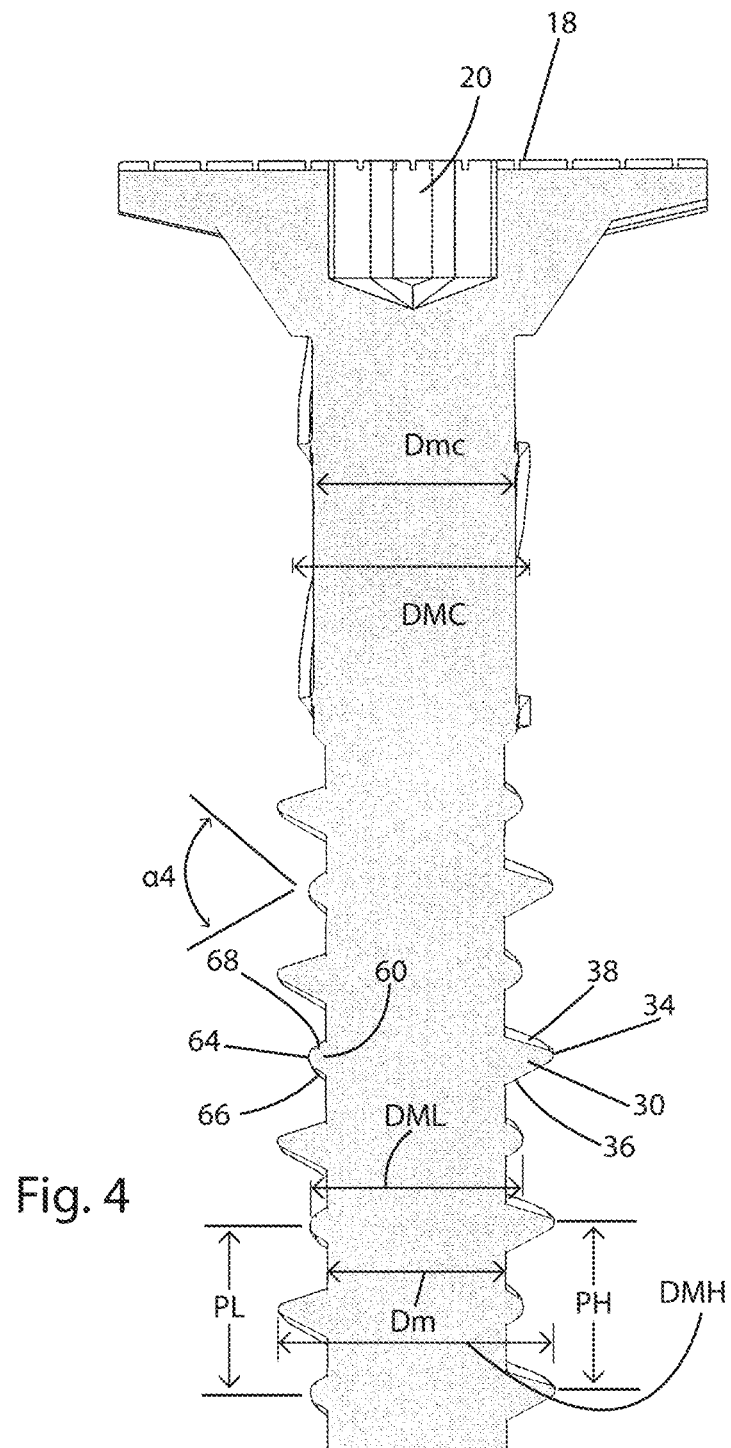
FIG. 4 shows a partial cross-section view of the screw taken along a plane in which the screw axis lies.
Figure 5:
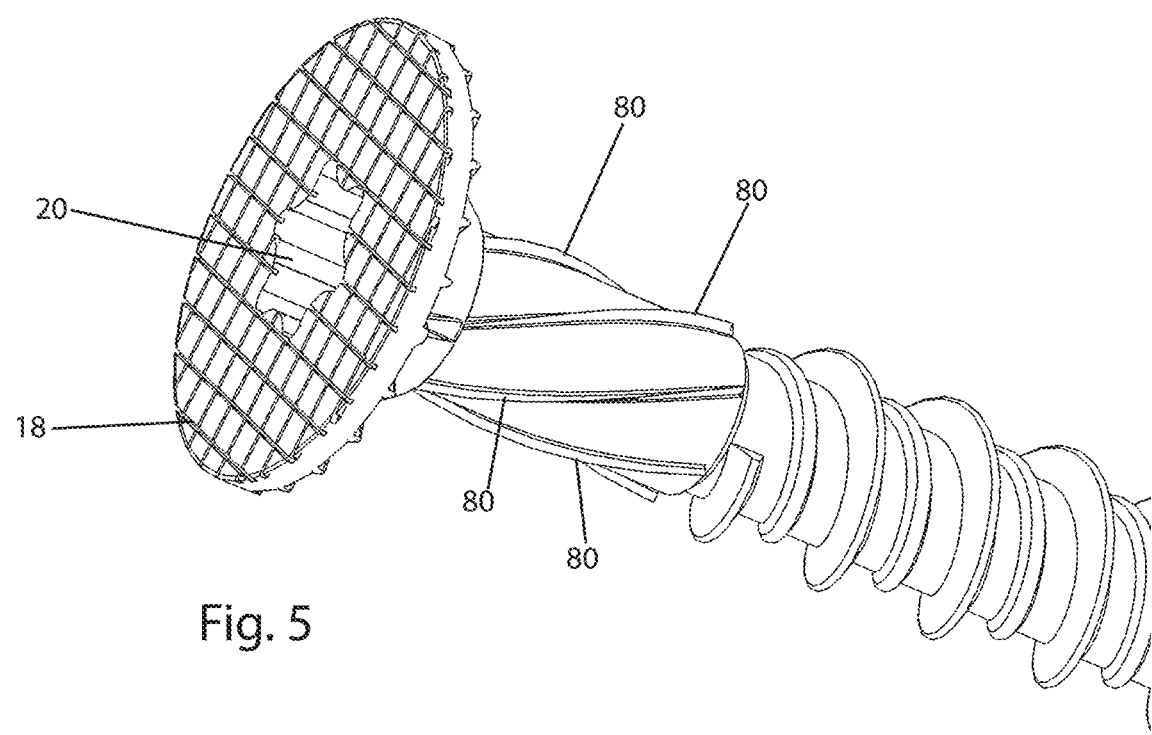
FIGS. 5 and 6 show partial perspectives of the head end of the screw.
Figure 6:
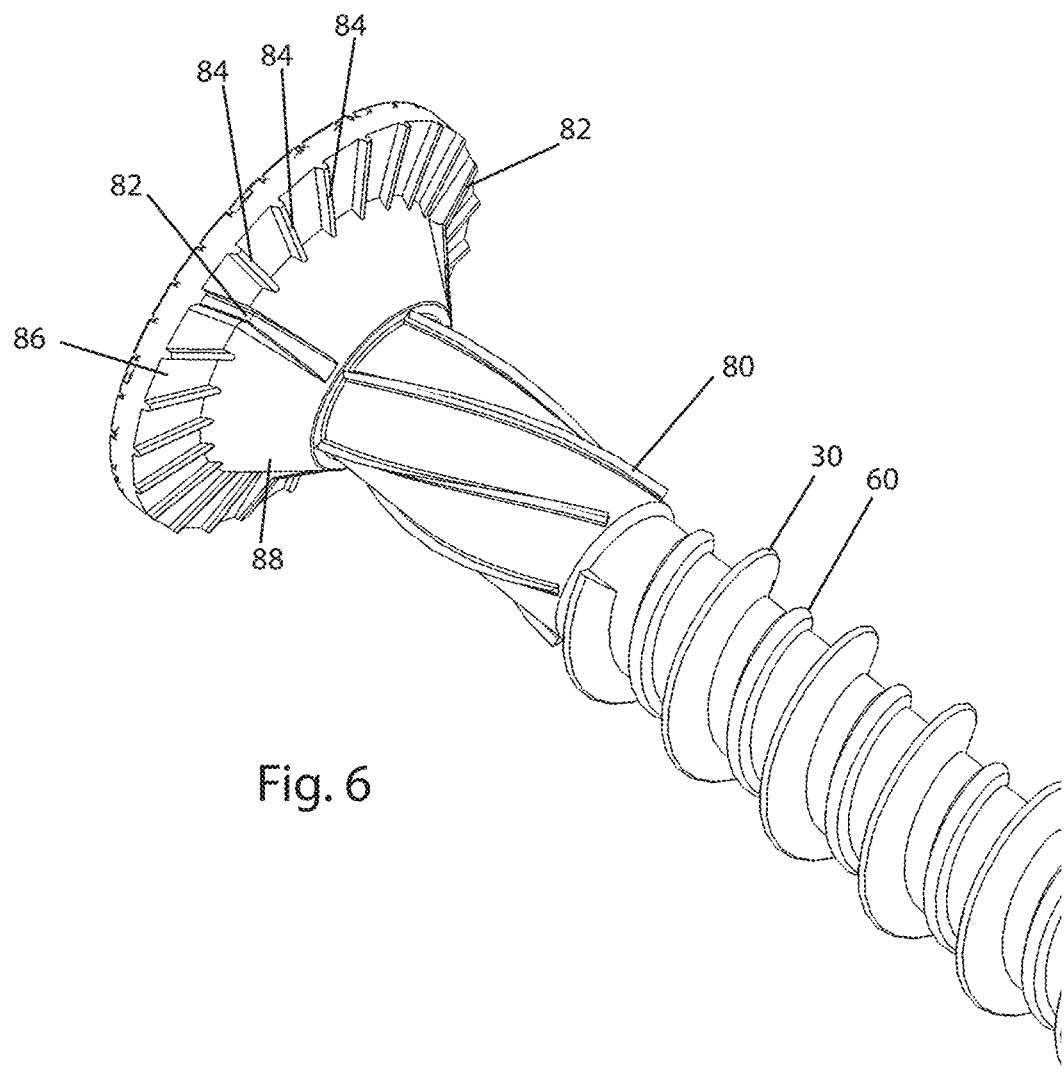
Figure 7:
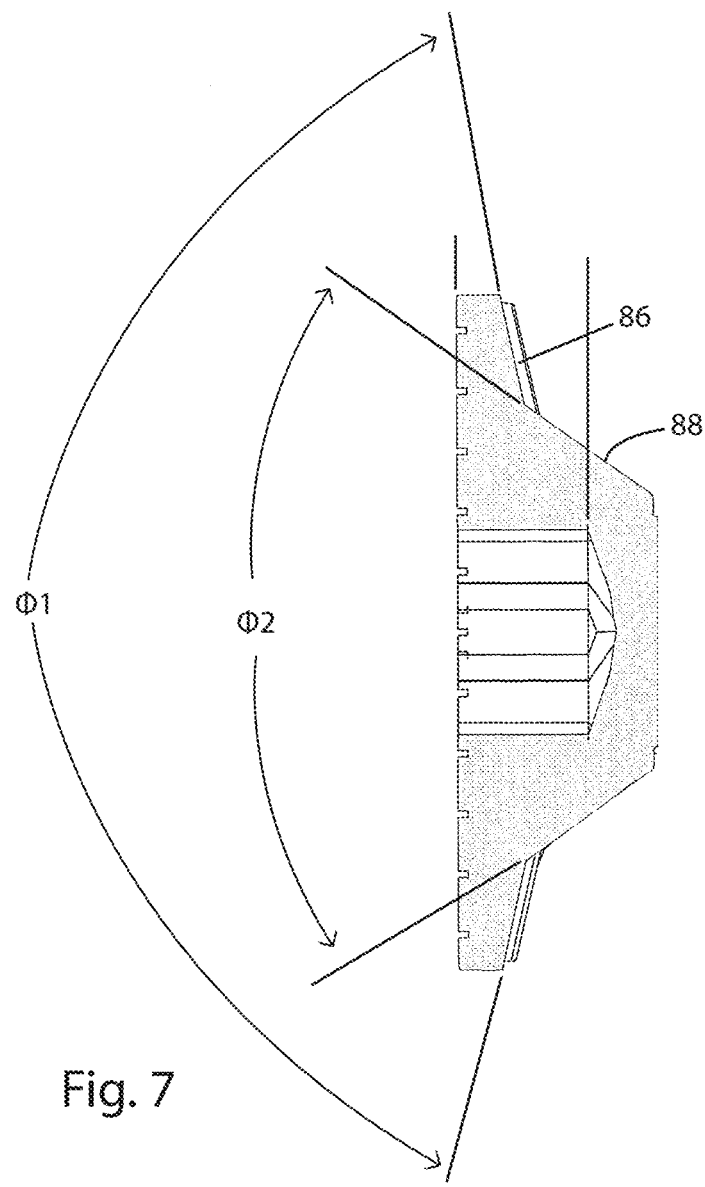
FIG. 7 shows a cross-section of the head end.
Figure 8:
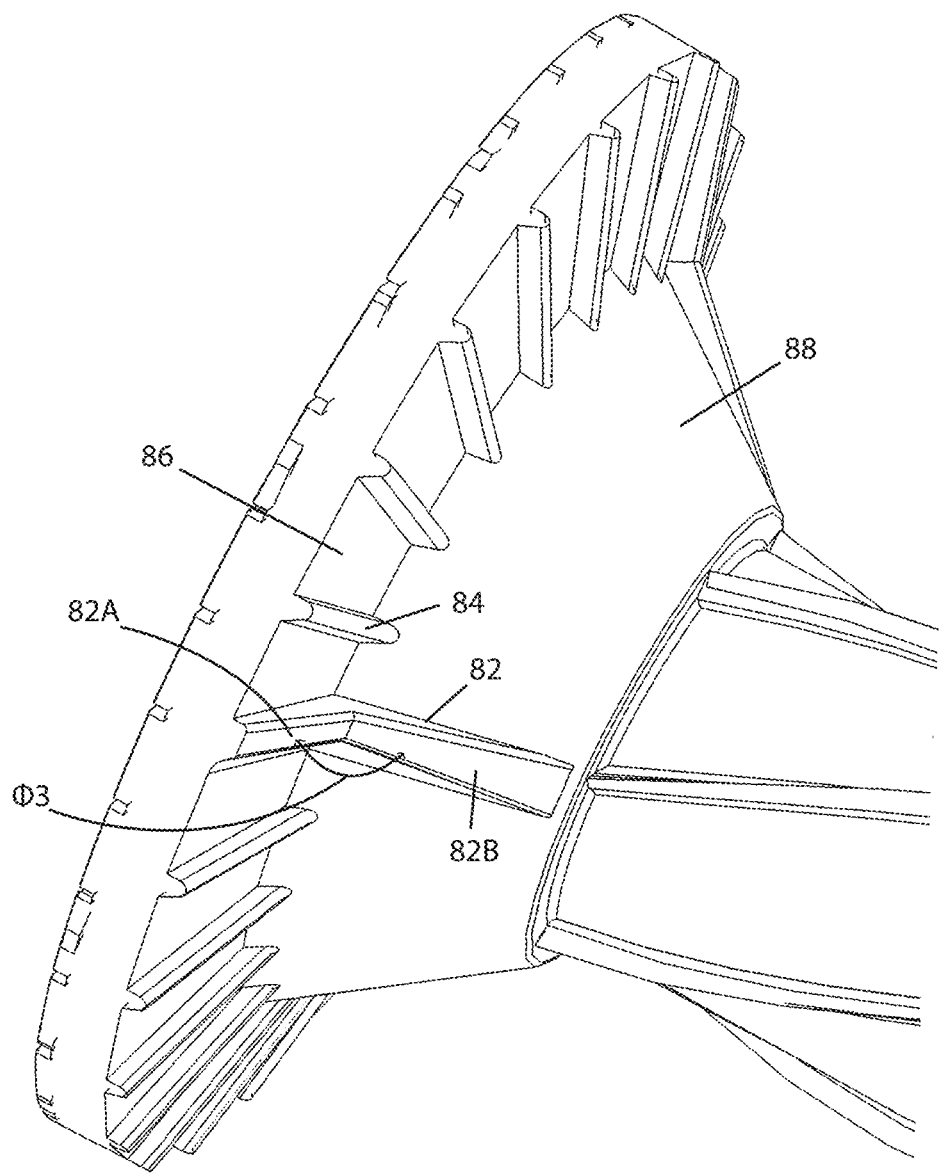
FIGS. 8 and 9 show enlarged views of the head end.
Figure 9:
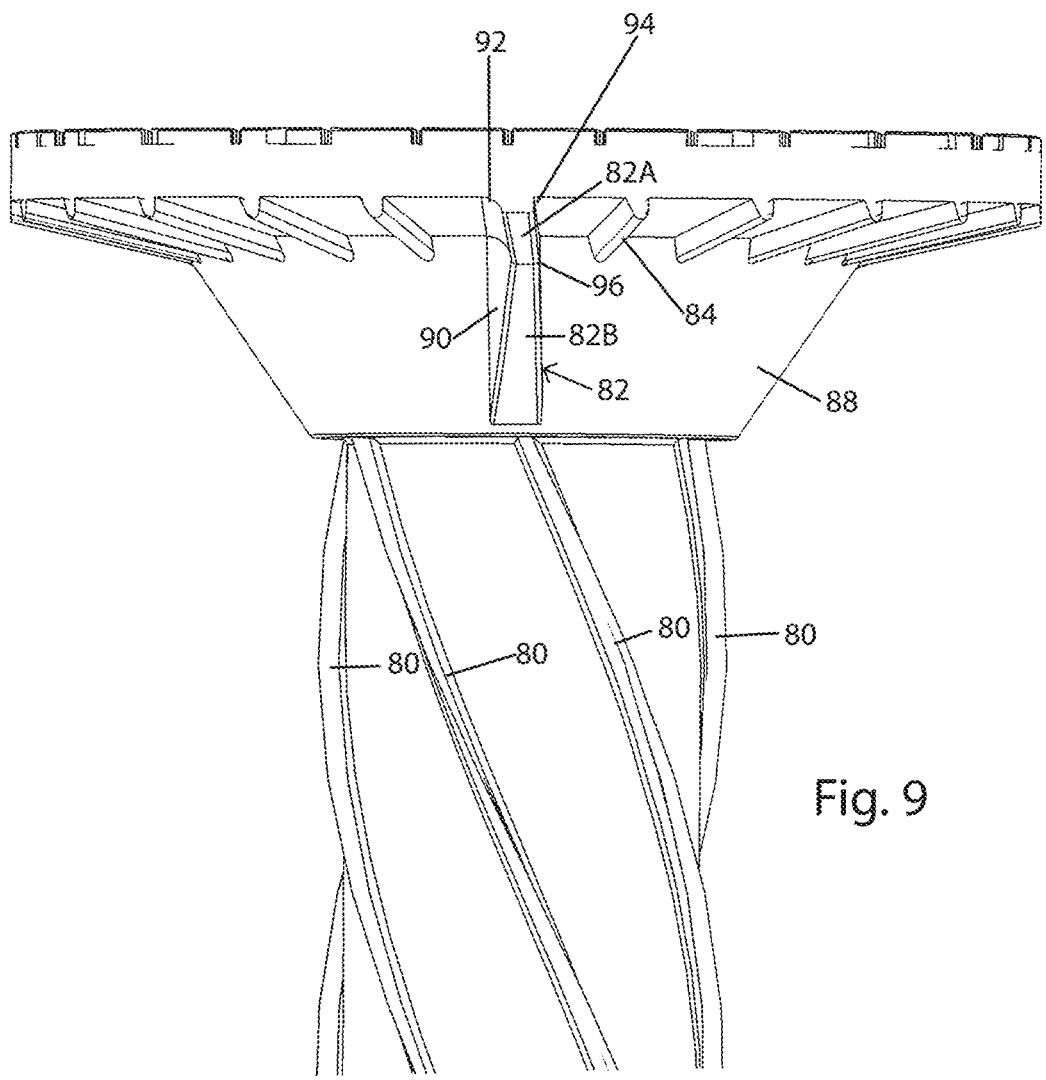
Figure 10:
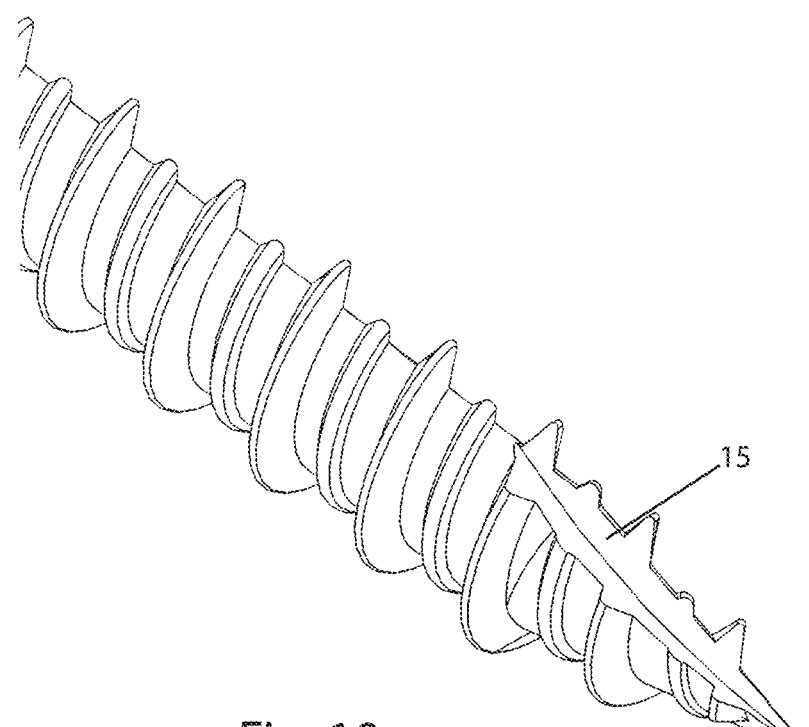
FIGS. 10 and 11 show partial perspectives of the tapered end.

Referring to FIGS. 1-13, one embodiment of a cement board screw 10 is shown. The cement board screw includes a head end 12, a shank or core 14 and a tapered end 16. The head end 12 includes an end face 18 with a drive recess 20 (e.g., a star recess or any other suitable drive recess). The end face may include a textured surface feature as shown, such as a pattern of recesses or other texturing. As used herein the term shank refers to the elongated core or shaft of the screw, which can include threaded and unthreaded portions. The tapered end 16 is located at an opposite end of the shank 14 and terminates in a point or tip 22. By way of example, the taper angle α1 defining the point 22 may be between about fifteen and about twenty-five degrees (such as about eighteen to twenty-three degrees). The tapered end may also include a wedge cut 15 as shown. The wedge cut begins at the tip and extends the full axial extent of the tapered end.

Figure 11:
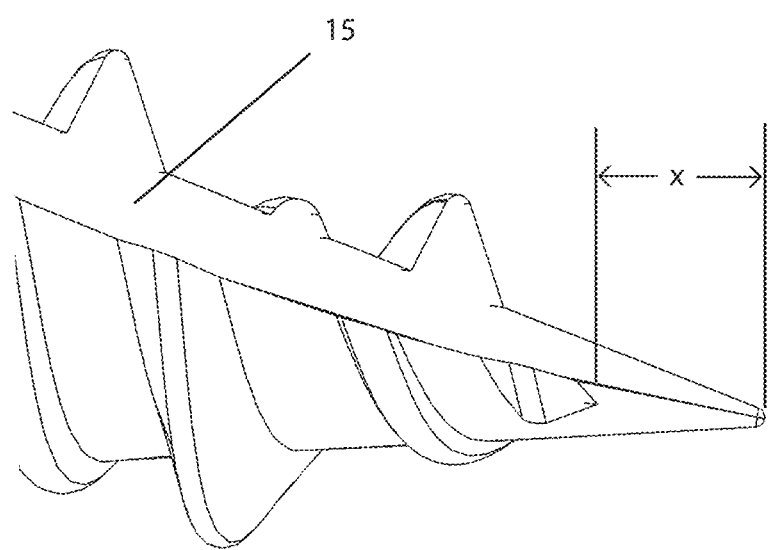
Figure 12:
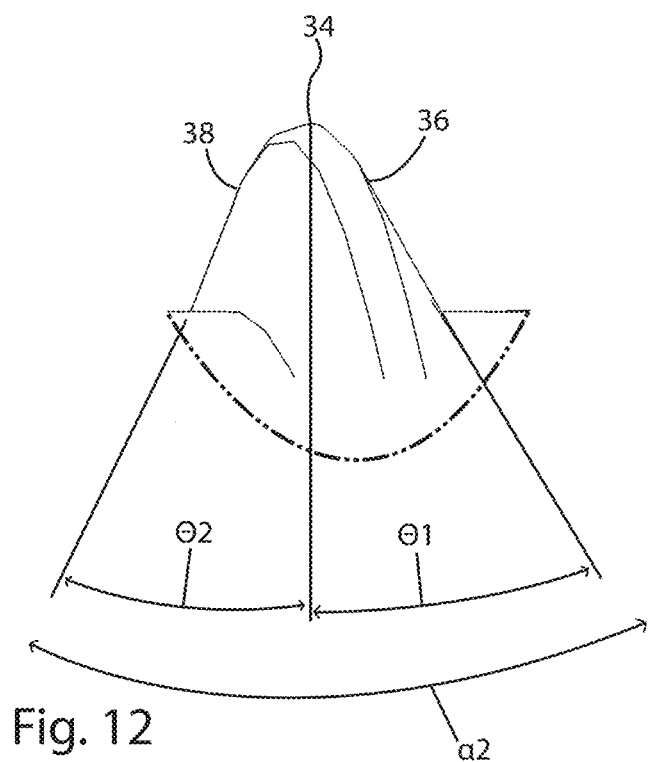
FIG. 12 shows an enlarged view of the high thread.
Figure 13:
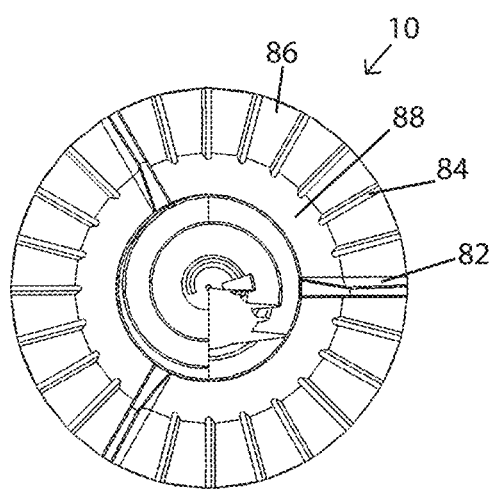
FIG. 13 shows a view looking along the screw axis at the tapered end of the screw.

A high thread 30 begins on the tapered end 16 (e.g., preferably slightly short of the tip as depicted by spacing X in FIG. 11, or at the tip), extends onto the shank 14 and terminates at a first axial location 32 along the shank. The spacing X may be, for example, in the range of 0.10 to 0.90 inches (e.g., 0.030 inches to 0.070 inches, or 0.40 to 0.060 inches). The high thread 30 is a right-hand thread as shown, and has a peripheral edge 34 formed where a leading flank 36 meets a trailing flank 38, which together define a high thread angle α2 of between about thirty-five degrees and about fifty-five degrees (e.g., between forty degrees and fifty degrees). In one implementation, the high thread is asymmetric, with a leading flank angle θ1 and a trailing flank angle θ2 that are different. In particular, the trailing flank angle is less than the leading flank angle. For example, the trailing flank angle may be no more than twenty degrees (e.g., between fifteen degrees and twenty degrees) and the leading flank angle may be no less than twenty-five degrees (e.g., between twenty-five degrees and thirty-five degrees). The high peripheral edge 34 may be defined with a radius of between about 0.002" and about 0.008", where the radius joins the leading and trailing faces of the thread.

The screw 10 has a penetrating axial length LP defined between the tip 22 of the tapered end 16 and the end face 18. An axial distance DH is defined between the tip 22 of the tapered end 16 and the first axial location 32. Here, the axial distance DH is at least seventy percent of the penetrating axial length LP of the screw. However, variations are possible (e.g., distance DH at least seventy-five percent of length LP or at least eighty percent).

A low thread 60 begins on the tapered end 16 (e.g., preferably slightly short of the tip or at the tip), extends onto the shank 14 and terminates at an axial location 62 along the shank. Here, the axial location 62 is substantially the same as the first axial location 32, and an axial length of the low thread is substantially the same as and contiguous with the axial length of the high thread. The low thread 30 is a right-hand thread as shown, and has a peripheral edge 64 formed where a leading flank 66 meets a trailing flank 68, which together define a low thread angle α4 of between about fifty degrees and about seventy degrees (e.g., between fifty-five degrees and sixty-five degrees). In one implementation, the low thread is symmetric, with a leading flank angle and a trailing flank angle that are both the same.

The pitch PH of the high thread 30 is substantially uniform along the length of the thread, as is the pitch PL of the low thread 60, and the low thread pitch PL is substantially the same as the high thread pitch PH. Each turn of the low thread 60 is located substantially at an axial mid-point between adjacent turns of the high thread 30. The substantially uniform thread pitch PH and PL may, for example, be between about 0.080 inches and about 0.140 inches (e.g., between about 0.100 inches and about 0.120 inches).

The high thread 30 includes a minor diameter Dm and a major diameter DMH, and the low thread 60 includes the same minor diameter Dm and a major diameter DML. The height of each thread along the shank 14 is defined as the major diameter less the minor diameter. The shank 14 is substantially a right-circular cylinder along the high and low threads, and the cross-section of the tapered end 16 is circular, where the cross-section lies in any plane that is perpendicular to the screw axis 50.

The axial location 32, 62 is spaced from the head end 12 and the shank 14 includes a set of counter threads 80 on the shank, where the counter threads run from proximate the axial location 32, 62 toward the head end 12. The counter threads 80, which operate as reaming threads, have a helical direction that is opposite a helical direction of the high thread and the low thread. The counter threads 80 have a major diameter DMC that is less than the major diameter DMH of the high thread and more than the major diameter DML of the low thread. The counter threads have a minor diameter Dmc that is greater than the minor diameter Dm of both the high thread and the low thread. Here, the set of counter threads is formed by six counter threads, wherein each counter thread extends helically through no more than one-hundred and twenty circumferential degrees. However, variations with more or less counter threads are possible. For example, the set of counter threads may be formed by no more than four counter threads, wherein each counter thread extends helically through no more than one-hundred and twenty circumferential degrees. Regardless of the number of counter threads, the counter threads 80 have a substantially uniform circumferential spacing about the shank as shown.

Figure 14:
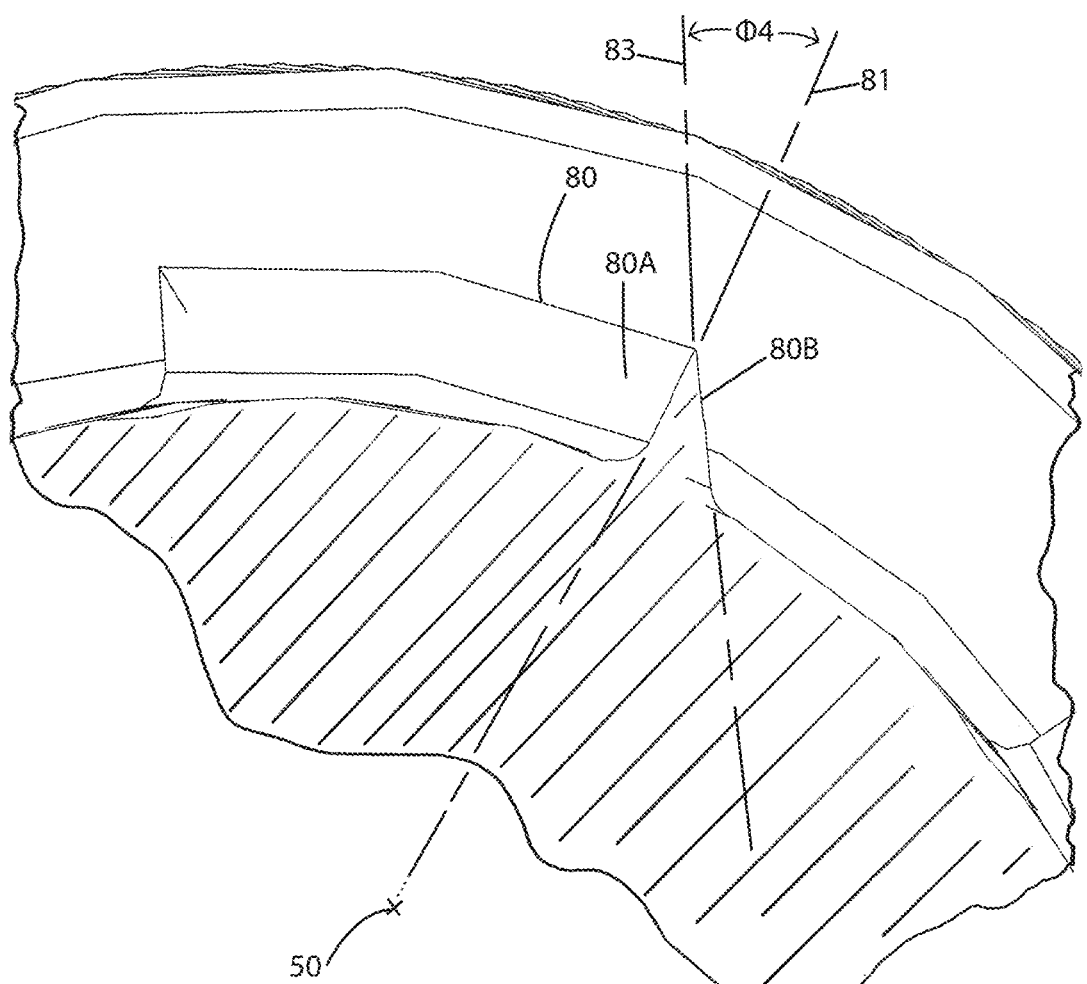
FIG. 14 shows a partial cross-section of the screw along a plane that runs perpendicular to the center axis of the screw and that is in the region of the counter threads.

As best seen in the end view partial cross-section of FIG. 14, in any given plane that is perpendicular to the center axis 50 of the screw and along the axial length of the counter threads, the trailing flank 80A of each counter thread 80 extends substantially radially, per line 81, and the leading flank 80B extends in a direction that is offset from radial in a direction toward the trailing flank 80A, per line 83. The angle φ4 that is enclosed by the two flanks 80A and 80B in the perpendicular plane of cross-section, is between about thirty degrees and about forty degrees (e.g., about thirty-five degrees).

The head end is formed as a countersunk head configuration with a frustoconical lower part having a plurality of nibs, including a plurality of large nibs 82 and a plurality of small nibs 84, where multiple small nibs are disposed between successive large nibs as shown. The head end includes both an outer lower part 86 and an inner lower part 88. The outer lower part 86 defines a frustoconical taper angle φ1 and the inner lower part defines a frustoconical taper angle φ2, where taper angle φ1 is larger than taper angle φ2. In one implementation the taper angle φ2 is at least twice the taper angle φ2. By way of example, φ2 may be in the range of sixty-five to seventy-five degrees.

TABLE 2

Exemplary Screw Dimensions
(All Ranges in Inches)

| PH & PL = | Dm = | DMH = | DML = | HTH = | LTH = |
|---|---|---|---|---|---|
| 0.100-0.120" | 0.110-0.130" | 0.175-0.195" | 0.135-0.150" | 0.045-0.085" | 0.005-0.040" |

The small nibs 82 are defined substantially on the outer lower part 86 (e.g., running from the head periphery to the inner lower part 88). The large nibs 82 are defined on both the outer lower part 86 and the inner lower part 88. The large nibs are defined by a first nib portion 82A on the outer lower part 86 and a second nib portion 82B on the inner lower part 88. The first portion 82A and the second nib portion 82B meet and define an interior nib angle φ3 that is between about thirty-five and about fifty degrees. The large nibs 82 have a uniform circumferential spacing. The plurality of large nibs may formed by no more than six large nibs (e.g., four large nibs spaced apart from each other by ninety degrees, or three large nibs spaced apart from each other by one-hundred twenty degrees). Each of the large nibs 82 includes a leading face 90 that joins the lower part at a radiused juncture 92 and a trailing face 96 that joins the lower part at a juncture 94 that is not radiused.

Various implementations of cement board screws in accordance with the configuration depicted in FIGS. 1-11 are possible. By way of example, Table 1 and Table 2 below set forth one examples of such a screw implementation, where the high thread and low thread include a minor diameter Dm, the high thread includes a major diameter DMH, the low thread includes a major diameter DML, the high thread includes a thread pitch PH, the low thread includes a thread pitch PL, the high thread includes a high thread height HTH on the shank, the low thread includes a low thread height LTH along the shank. Typical axial penetrating lengths LP for such screws may be in the range of between about one inch and about two and one-half inches, though other variations are possible.

TABLE 1

Exemplary Screw Dimensions
(All Ranges in Inches)

| PH & PL = | Dm = | DMH = | DML = | HTH = | LTH = |
|---|---|---|---|---|---|
| 0.080-0.140" | 0.090-0.150" | 0.155-0.215" | 0.115-0.170" | 0.005-0.125" | 0.005-0.080" |

Figure 15:
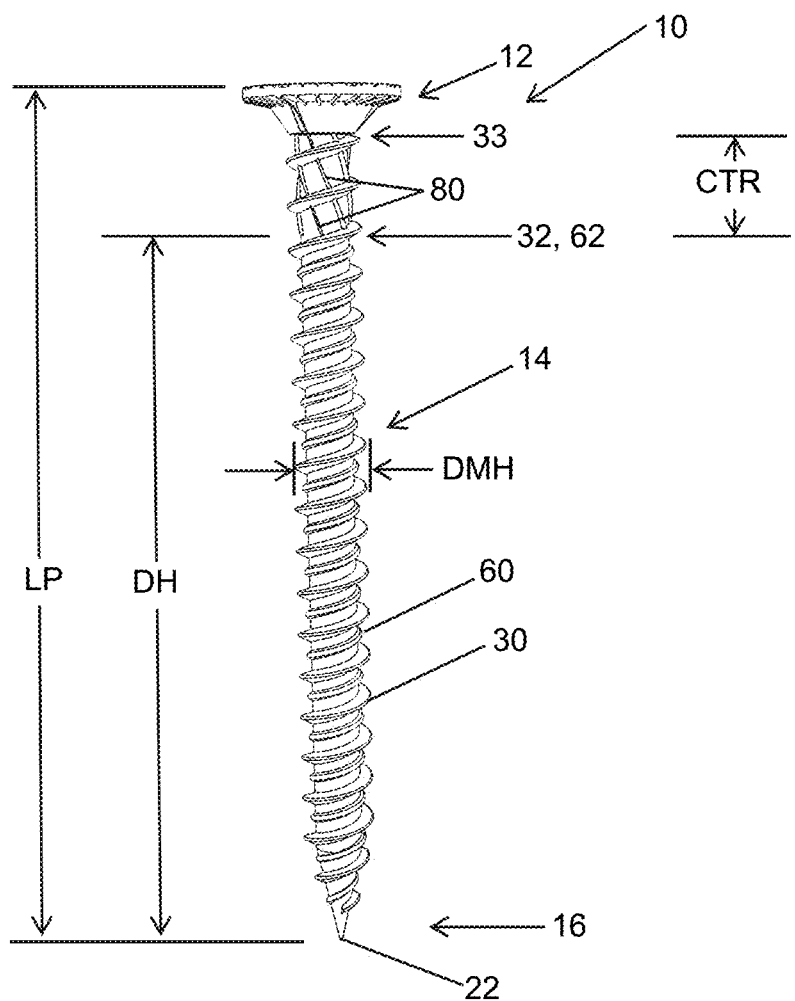
FIG. 15 shows a side elevation view of another embodiment of a cement board screw.
Figure 16:
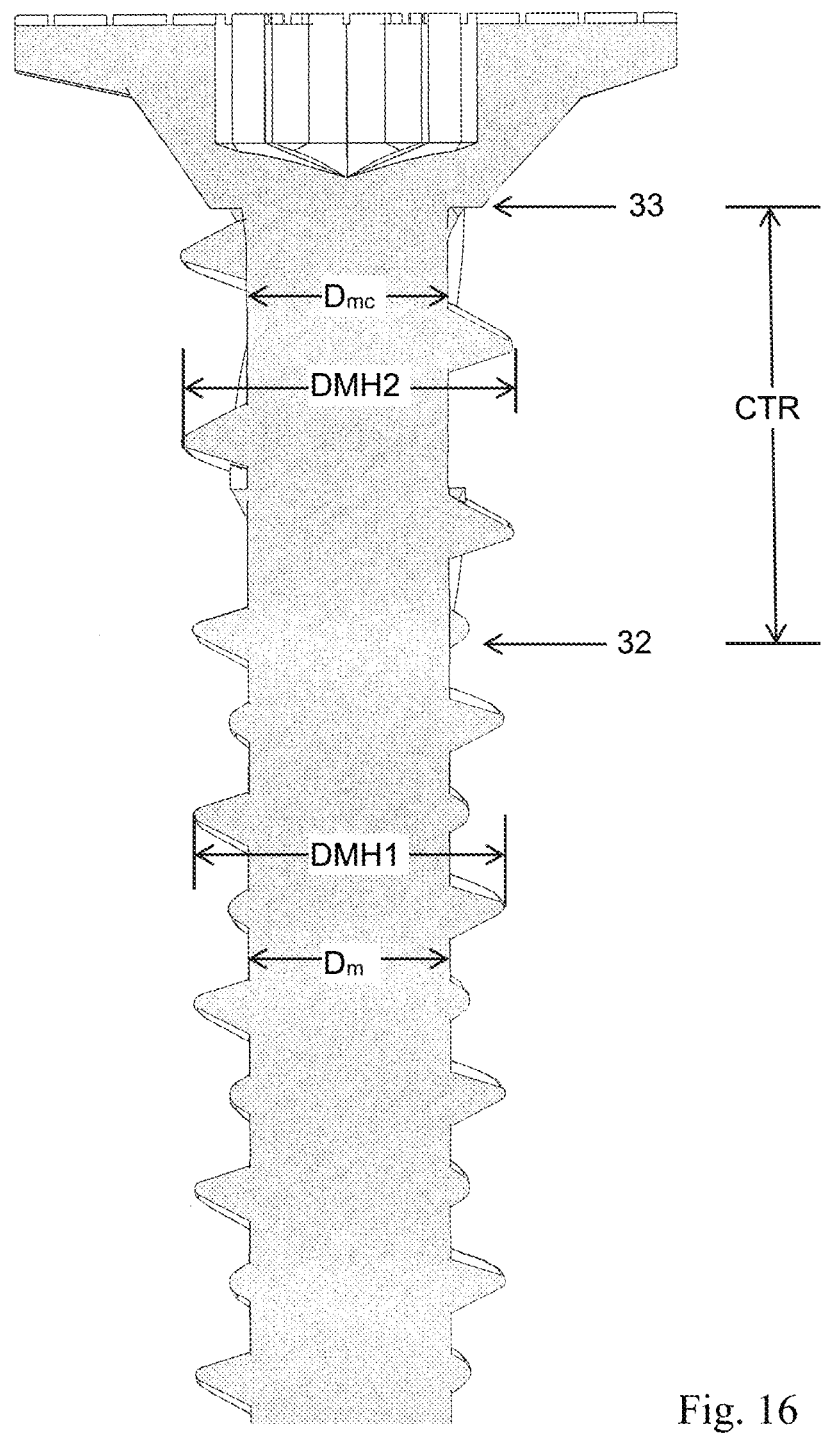
FIG. 16 shows a partial cross-section view of the screw of FIG. 15 taken along a plane in which the screw axis lies.

Referring to FIGS. 15 and 16, in another embodiment, a cement screw is provided having the attributes described above, with one or more of the following alterations. As shown in FIG. 15, a high thread 30 begins on the tapered end 16 (e.g., preferably slightly short of the tip as described above, or at the tip), extends onto the shank 14 and terminates at a second axial location 33 along the shank. A low thread 60 begins on the tapered end 16 (e.g., preferably slightly short of the tip or at the tip), extends onto the shank 14 and terminates at an axial location 62 along the shank. In this embodiment, the axial location 62 is substantially the same as the first axial location 32, and an axial length of the low thread is less than the axial length of the high thread. The axial location 32, 62 is spaced from the head end 12 and the shank 14 includes a set of counter threads 80 on the shank, where the counter threads run from proximate the axial location 32, 62 toward the head end 12, e.g., terminating at the second axial location 33, defining a counter thread region (CTR). Thus, the CTR comprises both the counter threads 80 and an end part of the high thread 30. This feature helps to prevent the screw from over-spinning, once the screw is fully penetrated and flushed within the board.

In one embodiment, the major diameter DMH2 of the high thread is the same in the counter thread region as the major diameter DMH1 along the rest of the shank. However, in an alternative embodiment, the major diameter DMH2 of the high thread in the counter thread region (CTR), is greater than the major diameter DMH1 of the high thread on the shank between the first axial location 32 and the tapered end 16. In one embodiment, the major diameter DMH2 of the high thread in the counter thread region is between 0.190" and 0.205" (such as between 0.195" and 0.200") and the major diameter DMH1 of the high thread between the first axial location 32 and the tapered end 16 is between 0.175" and 0.195" (such as between 0.181" and 0.198"). In one embodiment, the shank in the counter thread region may have a diameter Dmc that is slightly larger than diameter Dm, as in the screw described above. However, in the illustrated embodiment, the counter thread region (CTR) has a minor diameter Dmc that is substantially equal to the minor diameter Dm of both the high thread and the low thread along the rest of the shank.

The subject cement board screw includes advantageous features that improve performance. In particular, the asymmetric high thread profile improves pullout resistance, inclusion of both high and low threads renders a smoother finish in harder cement boards and wood studs, the wedge cut with sharp tip penetrates well into harder cement boards and harder woods and metal studs, the counter threads crush cement board fibers and render a smoother finish, the textured screw head end face allows bonding of finishing materials, adhesives, plasters, and fillers, the larger head nibs bite into the cement board during seating reducing torque to seat and the smaller nibs help in rendering smooth finish and flush seating.

What is claimed is:

1. A cement board screw, comprising:
   a head end, a shank and a tapered end, the head end including a tool engaging part, the head end located at one end of the shank and the tapered end located at an opposite end of the shank;
   a high thread formed along the shank, wherein the high thread begins on the tapered end, extends onto the shank and terminates at a second axial location along the shank, wherein the high thread defines a high peripheral edge, wherein the high thread includes a leading flank and a trailing flank that meet at the high peripheral edge and together define a high thread angle that is between about thirty-five degrees and about fifty-five degrees;
   a low thread formed along the shank, wherein the low thread begins on the tapered end, extends onto the shank and terminates substantially at a first axial location along the shank such that an axial length of the low thread is less than an axial length of the high thread, wherein the low thread defines a low peripheral edge, wherein the low thread includes a leading flank and a trailing flank that meet at the low peripheral edge and together define a low thread angle that is between about fifty degrees and about seventy degrees.

2. The cement board screw of claim 1 wherein: the cement board screw has a penetrating axial length, and a first axial distance between the tip of the tapered end and the first axial location is at least seventy percent of the penetrating axial length.

3. The cement board screw of claim 2 wherein the first axial distance is at least eighty percent of the penetrating axial length.

4. The cement board screw of claim 1 wherein the high thread is an asymmetric thread and the low thread is a symmetric thread.

5. The cement board screw of claim 4 wherein a trailing flank angle of the high thread is less than a leading flank angle of the high thread.

6. The cement board screw of claim 1 wherein the shank includes a set of counter threads on the shank and running from the first axial location to the second axial location, the counter threads having a helical direction that is opposite a helical direction of the high thread and the low thread, the counter threads overlapping with an end part of the high thread.

7. The cement board screw of claim 6 wherein the counter threads have a major diameter that is less than a major diameter of the high thread.

8. The cement board screw of claim 7 wherein the counter threads have a minor diameter that is substantially equal to a minor diameter of both the high thread and the low thread.

9. The cement board screw of claim 6 wherein set of counter threads is formed by no more than six counter threads, wherein each counter thread extends helically through no more than one-hundred and twenty circumferential degrees.

10. The cement board screw of claim 6 wherein each counter thread includes a leading flank and a trailing flank, and for each counter thread:
the trailing flank extends substantially radially in a plane that is perpendicular to a center axis of the screw.

11. The cement board screw of claim 10 wherein, for each counter thread:
the leading flank is offset from radial and extends in a direction toward the trailing flank.

12. The cement board screw of claim 1 wherein the high thread and low thread include a minor diameter Dm, the high thread includes a major diameter DMH along a main portion of the shank, the low thread includes a major diameter DML, the high thread includes a thread pitch PH, the low thread includes a thread pitch PL, the high thread includes a high thread height HTH on the shank, the low thread includes a low thread height LTH along the shank, wherein the cement board screw satisfies the following criteria:

| PH & PL = | Dm = | DMH = | DML = | HTH = | LTH = |
|---|---|---|---|---|---|
| 0.080-0.140" | 0.090-0.150" | 0.155-0.215" | 0.115-0.170" | 0.005-0.125" | 0.005-0.080" | and
the tapered end includes a wedge cut.

13. The cement board screw of claim 1, wherein the high thread includes a major diameter DMH1 along a main portion of the shank, and a major diameter DMH2 between the first axial location and the second axial location, and the major diameter DMH2 is greater than the major diameter DMH1.

14. The cement board screw of claim 1 wherein:
the head end includes an end face with a drive recess formed therein;
the head end is formed as a countersunk head configuration with a frustoconical lower part having a plurality of nibs, including a first plurality of large nibs and a second plurality of small nibs, wherein multiple small nibs are disposed between successive large nibs.

15. The cement board screw of claim 14 wherein:
the head end includes an outer lower part and an inner lower part, the outer lower part defining a first frustoconical taper angle and the inner lower part defining a second frustoconical taper angle, wherein the first frustoconical taper angle is larger than the second frustoconical taper angle;
the small nibs are defined substantially on the outer lower part:
the large nibs are defined on both the outer lower part and the inner lower part.

16. The cement board screw of claim 15 wherein the large nibs are defined by a first nib portion on the outer lower part and a second nib portion on the inner lower part, wherein the first nib portion and the second nib portion meet and define an interior nib angle that is between about thirty-five and about filly degrees.

17. The cement board screw of claim 15 wherein the first frustoconical taper angle is at least twice the second frustoconical taper angle.

18. The cement board screw of claim 14 wherein:
the plurality of large nibs have a uniform circumferential spacing,
the plurality of large nibs is formed by no more than six large nibs.

19. The cement board screw of claim 14 wherein each of the large nibs includes a leading face that joins the lower part at a radiused juncture and a trailing face that joins the lower part at a juncture that is not radiused.

20. The cement board screw of claim 1 wherein the tapered end includes a tip angle of between about fifteen and about twenty-five degrees.

21. The cement board screw of claim 1 wherein the high peripheral edge is defined with a radius of between about 0.002" and about 0.008".

22. A cement board screw, comprising:
a head end, a shank and a tapered end, the head end including a tool engaging part, the head end located at one end of the shank and the tapered end located at an opposite end of the shank;
a high thread formed along the shank, wherein the high thread begins on the tapered end, extends onto the shank and terminates at a second axial location along the shank, wherein the high thread defines a high peripheral edge, wherein the high thread includes a leading flank and a trailing flank that meet at the high peripheral edge and together define a high thread angle, wherein the second axial location is spaced from the head end;
a low thread formed along the shank, wherein the low thread begins on the tapered end, extends onto the shank and terminates substantially at a first axial location along the shank such that an axial length of the low thread is less than an axial length of the high thread, wherein the low thread defines a low peripheral edge, wherein the low thread includes a leading flank and a trailing flank that meet at the low peripheral edge and together define a low thread angle, wherein the low thread angle is larger than the high thread angle;

a set of counter threads on the shank and running from proximate the first axial location to the second axial location, the counter threads having a helical direction that is opposite a helical direction of the high thread and the low thread, wherein the counter threads overlap with an end part of the high thread.

23. The cement board screw of claim 22, the overlap of the counter threads with the end part of the high thread, near the head, helps in limiting over-spinning of cement board screw once the cement board screw is fully penetrated and flushed within cement board.

* * * * *